United States Patent
Jensen

(10) Patent No.: US 7,802,825 B2
(45) Date of Patent: Sep. 28, 2010

(54) METHOD AND SYSTEM FOR REPAIRING A DOWNCOMER PIPE IN A CORE SPRAY FOR A NUCLEAR REACTOR

(75) Inventor: Grant Clark Jensen, Morgan Hill, CA (US)

(73) Assignee: GE-Hitachi Nuclear Energy Americas, Wilmington, NC (US)

( * ) Notice: Subject to any disclaimer, the term of this patent is extended or adjusted under 35 U.S.C. 154(b) by 377 days.

(21) Appl. No.: 11/940,732

(22) Filed: Nov. 15, 2007

(65) Prior Publication Data

US 2009/0127854 A1 May 21, 2009

(51) Int. Cl.
*F16L 21/00* (2006.01)
(52) U.S. Cl. .................... 285/419; 285/412; 285/332.1; 285/18; 285/27
(58) Field of Classification Search .................. 285/191, 285/192, 419, 412, 373, 368, 332.1, 332, 285/18, 27, 339, 343, 24
See application file for complete search history.

(56) References Cited

U.S. PATENT DOCUMENTS

| | | | | |
|---|---|---|---|---|
| 212,547 A | * | 2/1879 | Forbes | 285/419 |
| 1,579,648 A | * | 4/1926 | Crickmer | 285/373 |
| 2,052,958 A | * | 9/1936 | Webb | 285/419 |
| 2,482,021 A | * | 9/1949 | Mickelson | 285/419 |
| 2,937,038 A | * | 5/1960 | Gondek | 285/368 |
| 4,640,537 A | * | 2/1987 | Chaix et al. | 285/368 |
| 4,753,461 A | * | 6/1988 | Miller | 285/338 |
| 5,118,139 A | * | 6/1992 | Lott | 285/419 |
| 5,188,397 A | * | 2/1993 | Hynes | 285/419 |
| 5,309,991 A | * | 5/1994 | Watkins | 285/309 |
| 5,947,529 A | | 9/1999 | Jensen | |
| 6,131,962 A | | 10/2000 | Jensen et al. | |
| 6,918,619 B2 | * | 7/2005 | Thompson | 285/412 |

\* cited by examiner

*Primary Examiner*—David E Bochna
(74) *Attorney, Agent, or Firm*—Nixon & Vanderhye P.C.

(57) ABSTRACT

A slip joint assembly has been developed for a downcomer pipe in a core spray system of a nuclear reactor pressure vessel, the slip joint assembly including: a housing sleeve formed around a slip joint in the downcomer pipe, wherein an annular gap exists between an inside surface of the housing sleeve and the downcomer pipe; an upper wedge and a lower wedge insertable in the gap; a wedge bolt extending through the gap and extending through the upper wedge and lower wedge, wherein the bolt applies a force pulling the upper and lower wedge together to secure the housing sleeve to the downcomer pipe; an upper pin extending from the housing sleeve into an aperture of an upper section of the downcomer pipe, and a lower pin extending from the housing sleeve into an aperture of a lower section of the downcomer pipe.

12 Claims, 10 Drawing Sheets

METHOD AND SYSTEM FOR REPAIRING A DOWNCOMER PIPE IN A CORE SPRAY FOR A NUCLEAR REACTOR

BACKGROUND OF THE INVENTION

This invention relates generally to nuclear reactors and, more particularly, to an apparatus and method for repairing or replacing welds in piping within a reactor pressure vessel of a reactor.

A reactor pressure vessel (RPV) of a boiling water reactor (BWR) typically has a generally cylindrical shape and is closed at both ends, e.g., by a bottom head and a removable top head. A core shroud typically surrounds the reactor core and is contained within the RPV.

Boiling water reactors generally include piping for core spray cooling water. Core spray piping is used to deliver water from outside the RPV to core spray spargers inside the RPV. The core spray piping generally includes vertical downcomer pipes. Upper and lower sections of each downcomer pipe are typically joined together during reactor assembly. The upper piping section is trimmed to provide the proper length and fit-up with the lower piping section. The slip coupling welded to the upper and lower piping sections prevents coolant leakage and also provides the necessary structural strength needed in the downcomer piping system.

The core spray piping systems in operating BWRs are of welded construction. Welds in the spray piping are susceptible to stress corrosion cracking, particularly intergranular stress corrosion cracking (IGSCC). Reactor components are subject to a variety of stresses associated with differences in thermal expansion, the operating pressure needed for the containment of the reactor cooling water, and other stress sources such as residual stresses from welding, cold working and other inhomogeneous metal treatments. Water chemistry, welding, heat treatment and radiation can increase the susceptibility of metal in a component to stress corrosion cracking. Accordingly, there is a long felt need for devices and methods for repairing welds in downcomer pipes.

BRIEF DESCRIPTION OF THE INVENTION

A repair or reinforcement clamping device has been developed that structurally supports welded joints in a downcomer pipe. A reinforcing slip joint clamp has been developed to structurally replace the slip joint between the upper and lower sections of a downcomer pipe. The slip joint clamp fits over and serves as a supporting sleeve to the welds and sleeve previously applied to join the upper and lower sections of the downcomer pipe. The slip joint clamp may include a multi-part clamp assembly (sleeve) fitted over the welded slip joint. A slip joint assembly has been developed for a downcomer pipe in a core spray system of a nuclear reactor pressure vessel, the slip joint assembly including: a housing sleeve formed around a slip joint in the downcomer pipe, wherein an annular gap exists between an inside surface of the housing sleeve and the downcomer pipe; an upper wedge and a lower wedge insertable in the gap; a wedge bolt extending through the gap and extending through the upper wedge and lower wedge, wherein the bolt applies a force pulling the upper and lower wedges together to secure the housing sleeve to the downcomer pipe; an upper pin extending from the housing sleeve into an aperture of an upper section of the downcomer pipe, and a lower pin extending from the housing sleeve into an aperture of a lower section of the downcomer pipe.

A method has been developed to assemble a slip joint clamp assembly to repair a downcomer pipe in a core spray system of a nuclear reactor pressure vessel, the method comprising: placing a housing sleeve around the slip joint; using a guide wire to position a lower wedge and a wedge bolt extending up through the lower wedge down into the vessel such that the lower wedge is below the housing sleeve around the slip joint and the bolt is in a gap between the sleeve and the downcomer pipe; with the guide wire, raising the lower wedge and wedge bolt such that the lower wedge moves into the gap and an upper end of the wedge bolt extends above the housing sleeve; sliding an upper wedge down the guide wire and onto the wedge bolt; attaching a keeper nut on an upper end of the wedge bolt and above the upper wedge, and tightening the nut on the wedge bolt and thereby applying a force pulling towards each other the upper wedge and lower wedge. The guide wires are then disconnected from the wedge bolts and removed from the rector vessel.

DETAILED DESCRIPTION OF THE INVENTION

A slip joint clamp assembly has been developed that attaches to a downcomer pipe and secures a welded slip joint in the pipe. The slip joint clamp assembly structurally replaces or reinforces an existing slip joint welded sleeve to join upper and lower sections of the downcomer pipe.

Figure 1:
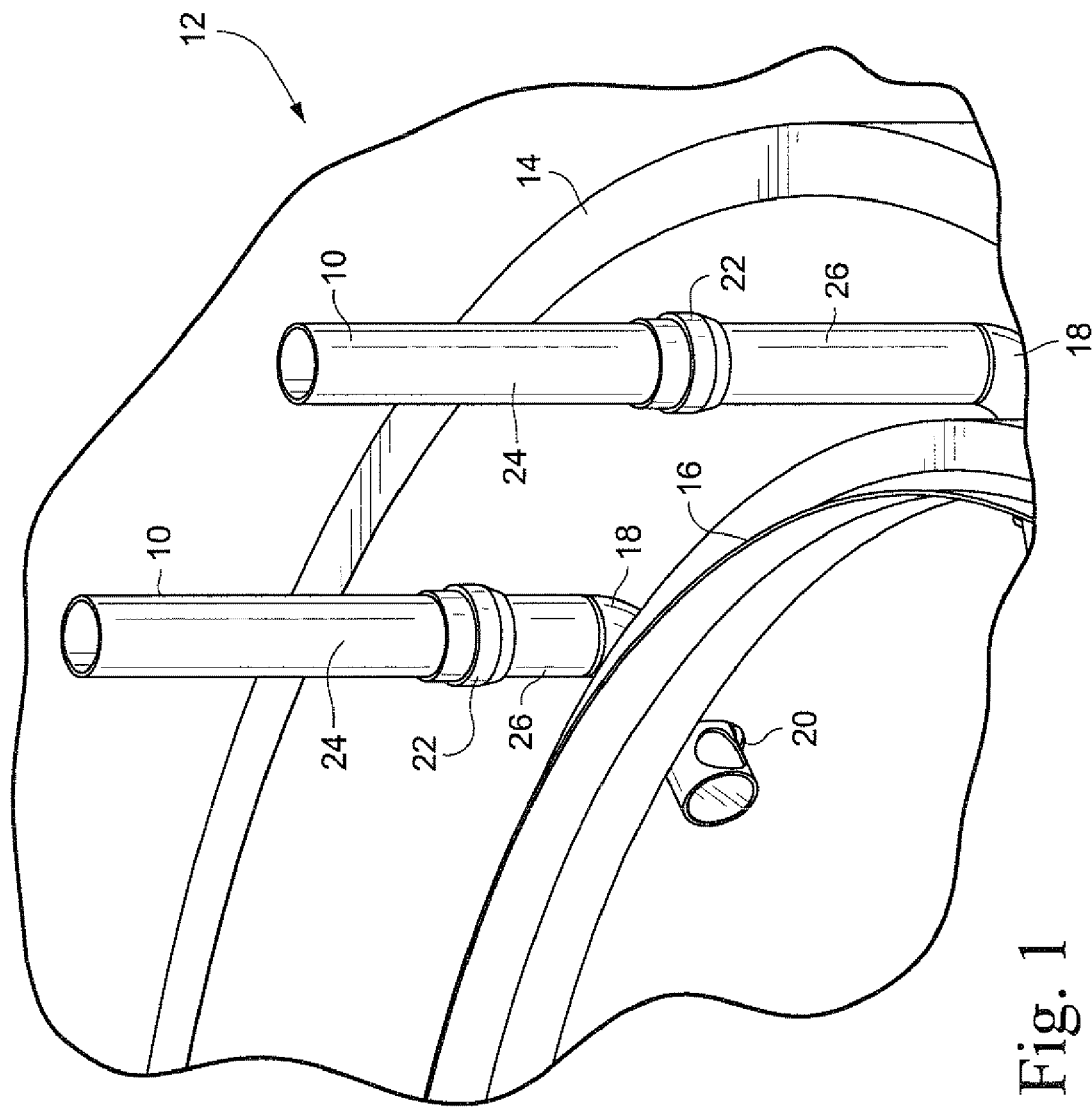
FIG. 1 is a perspective view of a downcomer pipe and a shroud assembly of a reactor pressure vessel (RPV) of a boiling water nuclear reactor.

FIG. 1 illustrates downcomer pipes 10 of a core spray cooling water system for a boiling water reactor (BWR) 12 having an outer wall 14 of a reactor pressure vessel (RPV) and a reactor shroud 16. The downcomer pipes 10 each extend vertically down in the annular gap between the outer wall 14 and shroud 16, and connect to an elbow pipe 18 that connects to a conduit 20, that extends through the wall of the shroud 16. Cooling water from the downcomer pipes flow through the elbow pipe and conduit to the sparger piping internal to the shroud and over the reactor core. The core spray sparger piping and associated spray nozzles internal to the shroud are conventional but not shown in FIG. 1.

Figure 2:
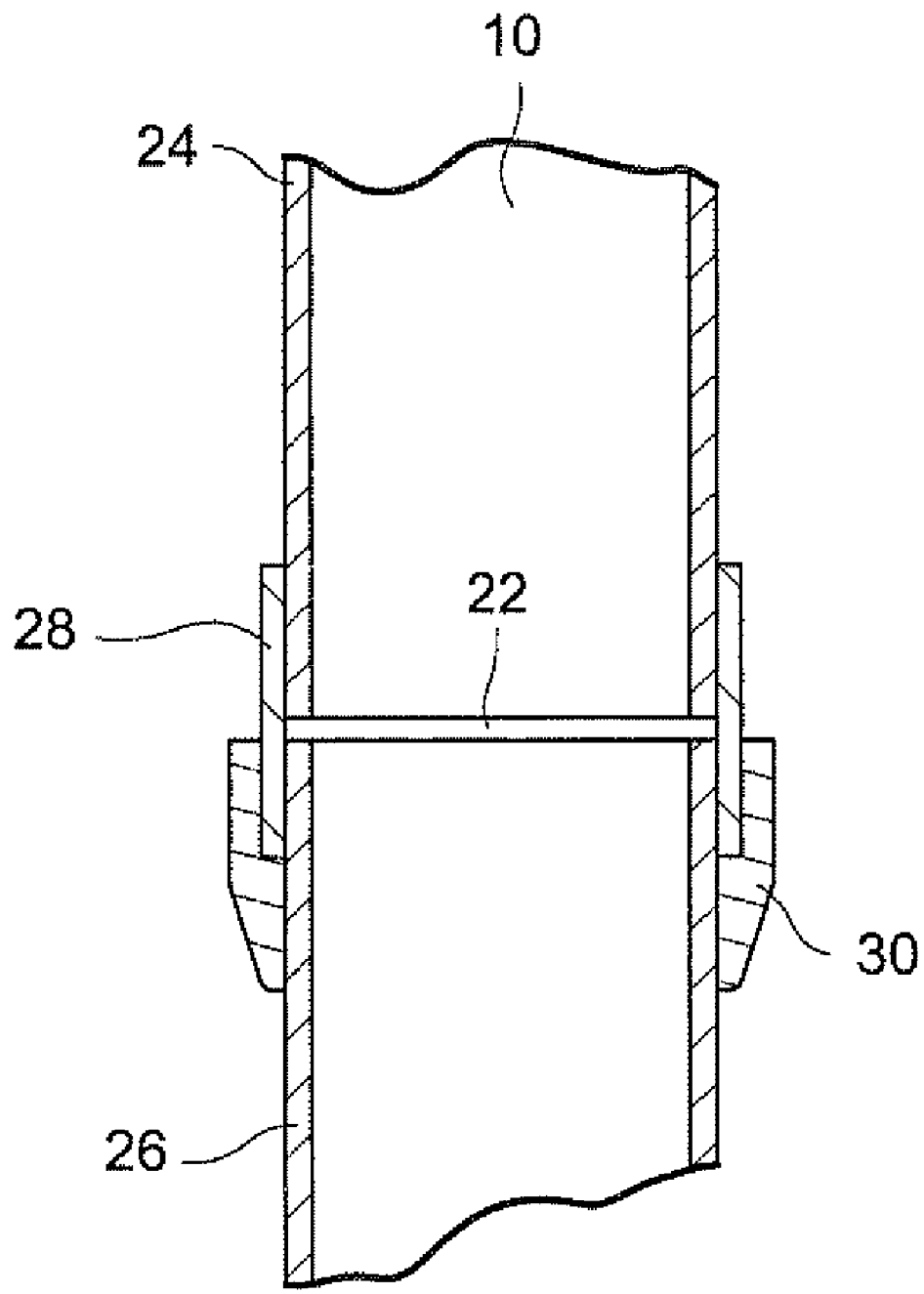
FIG. 2 is a cross-sectional view of a conventional joint between an upper and lower section of the downcomer pipe.

FIG. 2 is a cross-sectional diagram of a slip joint 22 between the upper and lower piping sections 24, 26 of a downcomer pipe. The slip joint 22 couples the upper section 24 and lower section 26 of the downcomer pipe. The lower pipe section 26 may be of various lengths depending on the elevation of the core spray piping conduit penetrating the shroud. The slip joint 22 couples the opposing ends of the upper and lower pipe sections 24, 26 of the downcomer pipe. The joint may include a cylindrical sleeve 28 around the ends of the upper and lower sections of the pipe, and an annular receptacle 30 supporting the sleeve. The receptacle is welded to the lower downcomer pipe section 26, the sleeve is welded to the upper downcomer pipe section, and the sleeve and receptacle are welded together.

Figure 3:
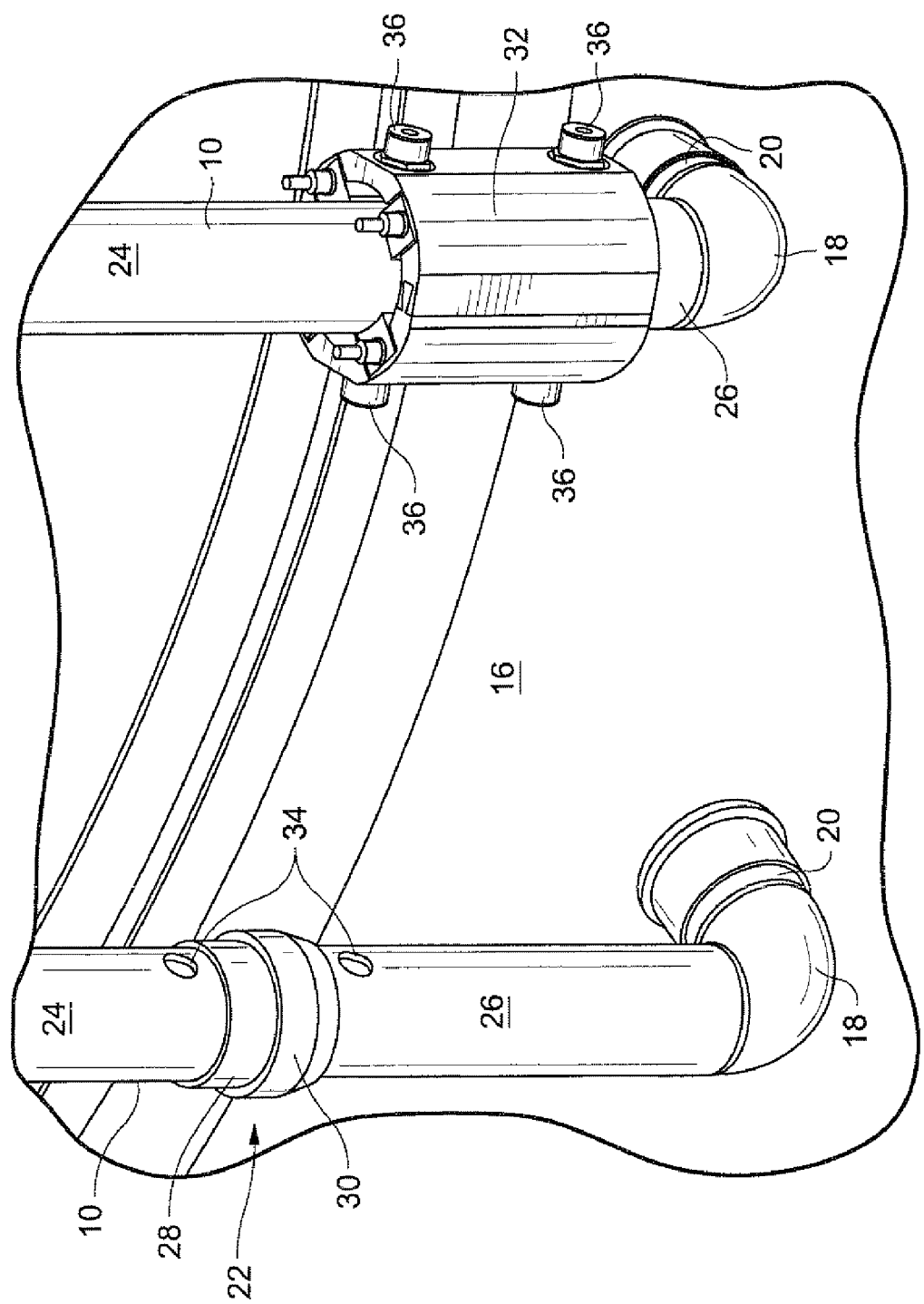
FIG. 3 is a perspective view of a lower portion of two downcomer pipes and the pipe attachment to the shroud assembly, wherein one downcomer pipe is shown with a slip joint clamp assembly and the other pipe is shown without a clamp assembly to illustrate the joint between the upper and lower sections of the downcomer pipe.

FIG. 3 is a side-perspective view of two downcomer pipes 10 each coupled through an elbow pipe 18 and conduit 20 to the wall of the shroud 16 of the reactor core. The wall of the RPV is not shown in FIG. 3 to better show the downcomer pipes. The left side downcomer pipe in FIG. 3 is being readied for placement of a slip joint clamp. The slip joint clamp 32 is shown installed on the right-hand side downcomer pipe.

The slip joint clamp, in one embodiment, is a cylindrical sleeve that fits over the slip joint 22 (see sleeve 28 and annular receptacle 30) joining the upper section 24 and lower section 26 of a downcomer pipe. Whereas the slip joint is fabricated or assembled during assembly of the RPV, the slip joint clamp 32 is installed after the RPV has been assembled and its reactor core has been in operational service. The slip joint clamp assembly—may be installed as a pre-emptive repair of a faulty slip joint. The slip joint clamp 32 may be installed while the reactor is shut down and the RPV is open for service. Machining conical holes 34 above and below the slip joint is an initial step for installing the slip joint clamp 32. The conical holes may be machined by electronic discharge machining (EDM), where the EDM is preformed by lowering an EDM actuator down to the desired hole locations on the upper and lower sections 24, 26 of the downcomer pipe. Pairs of conical holes 34 are formed on opposite sides of each of the upper and lower sections of the downcomer pipe. The conical holes 34 are to receive four lateral pins 36 that secure the slip joint clamp to the downcomer pipe. The lateral pins each have a conical tip 37 (FIG. 5) that seats in a corresponding conical hole 34 of the downcomer pipe.

Figure 4:
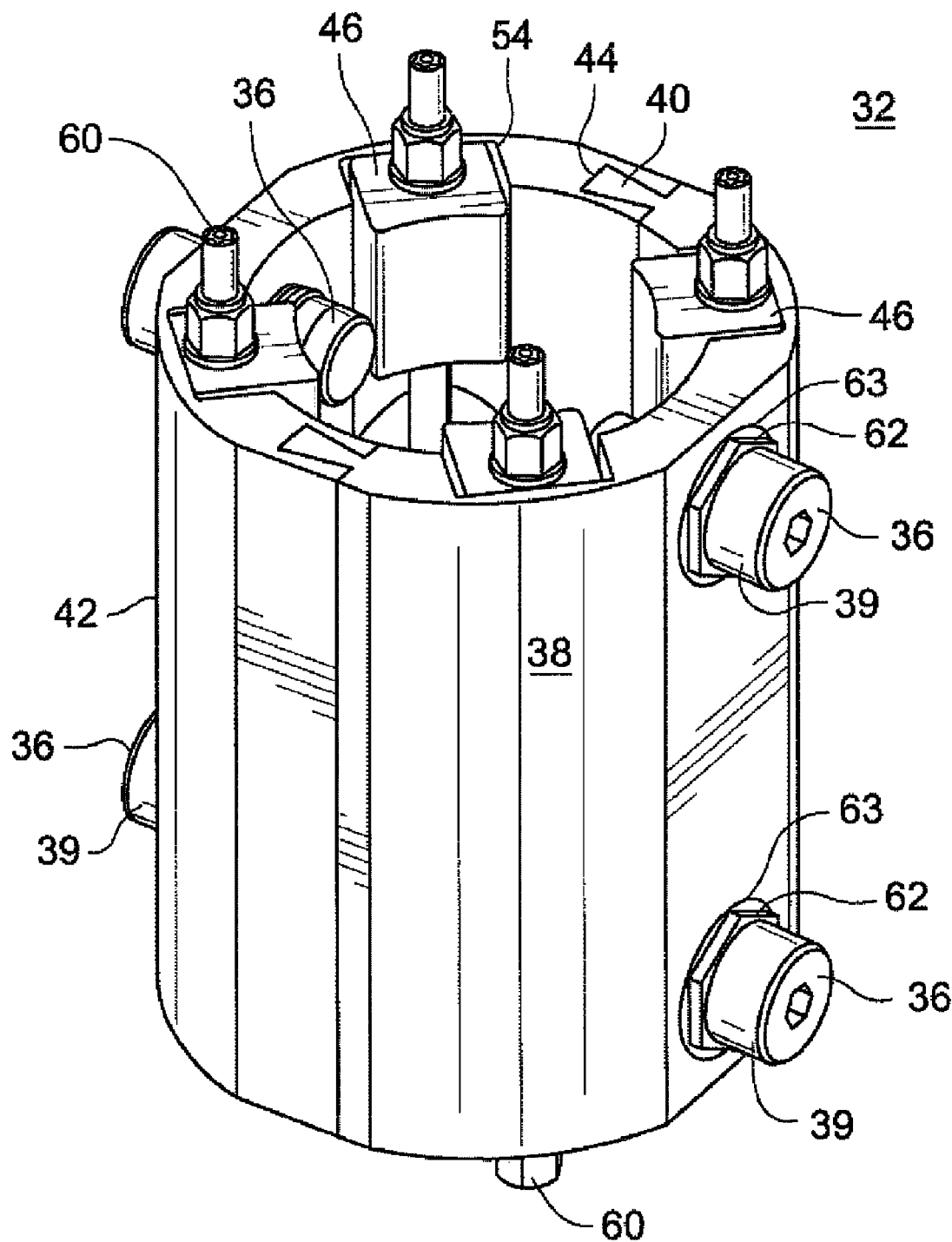
FIG. 4 is a perspective view of the slip joint clamp assembly.

FIG. 4 is a perspective view of the slip joint clamp 32 shown fully assembled but separated from a downcomer pipe. In practice, the slip joint clamp would be assembled around the downcomer pipe. The slip joint clamp includes a pair of opposing half-housings 38, 42 that fit together to form a sleeve for the downcomer pipe. The half-housings include a male half-housing 38 having a male connector 40, e.g., a dovetail, extending along the axial edges of the half-housing. A female half-housing 42 attaches to the male half-housing by, for example, a mating dove-tail slot 44, to receive the male connector 40. Preferably, the female half-housing slides axially on the male connector so that the female half-housing is attached to the male half-housing by lowering the female half-housing onto the male half-housing. Each half housing may form half of the cylindrical sleeve of the slip joint clamp and may be a half-circle in cross-section.

When assembled, the male and female half housings 38, 42 form a cylindrical sleeve around the downcomer pipe. A gap remains between the inside surfaces of the half housings and the downcomer pipe. The gap is sufficient to allow the slip joint clamp to slide over the slip joint. When the slip joint clamp 32 is secured to the downcomer pipe, the lateral pins 36 and wedges 46 ensure that the upper and lower sections of the pipe remain joined together even if the welds of the slip joint deteriorate. The lateral pins 36 and associated conical holes 34 in the downcomer piping segments establish the relative position of the slip joint clamp assembly with the downcomer slip joint. The wedges 46 maintain a uniform annular gap between the slip joint clamp assembly and the downcomer piping. The wedges 46 are arranged between an inside surface of the assembled half-housings 38, 42 and the downcomer pipe.

Figure 5:
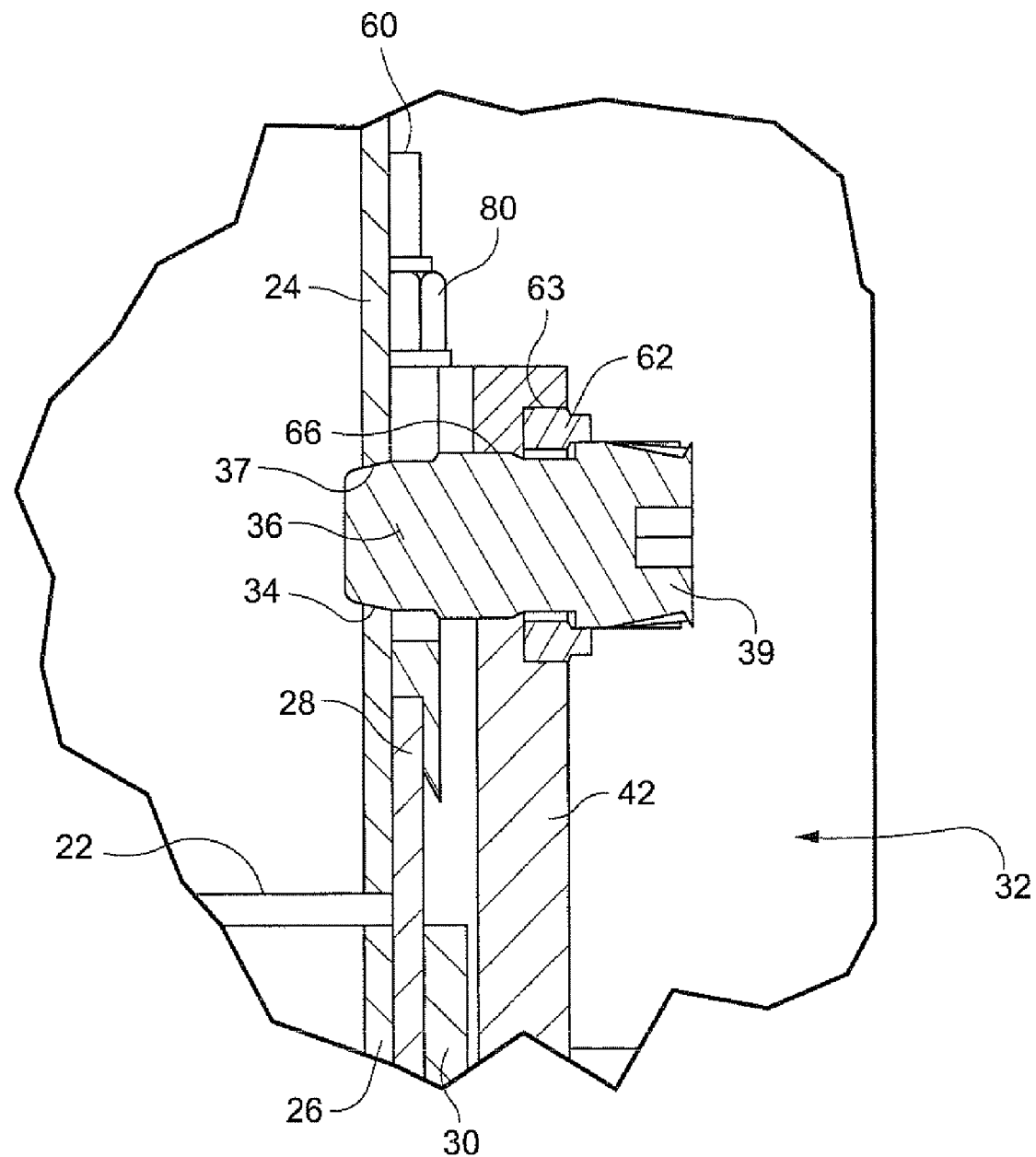
FIG. 5 is a side, cross-sectional view of a lateral pin extending through the slip joint clamp assembly and into the downcomer pipe.

FIG. 5 is a cross-sectional view of the slip joint clamp attached to the downcomer pipes. FIG. 5 shows the engagement of the lateral pins 36 to the slip clamp assembly 32 and the upper downcomer pipe 24. The threaded lateral pins 36 engage a right-handed threaded aperture 66 in one of the half housings 42 of the slip clamp assembly. The pins 36 each a have conical tip 37 that seats into a corresponding one of the conical holes 34 of the downcomer pipe 24. A crimp collar 62 has external left-hand threads and seats in a threaded recess 63 (the left-handed threads are actually in the counter-bored portion of the aperture, 66) coaxial with the right-handed threaded aperture 66 in the half housing. The crimp collar is deformed into flutes that are machined into the cylindrical head 39 of the lateral pin 36 to prevent the pin from turning and becoming lose during operation of the reactor vessel.

Figure 6:
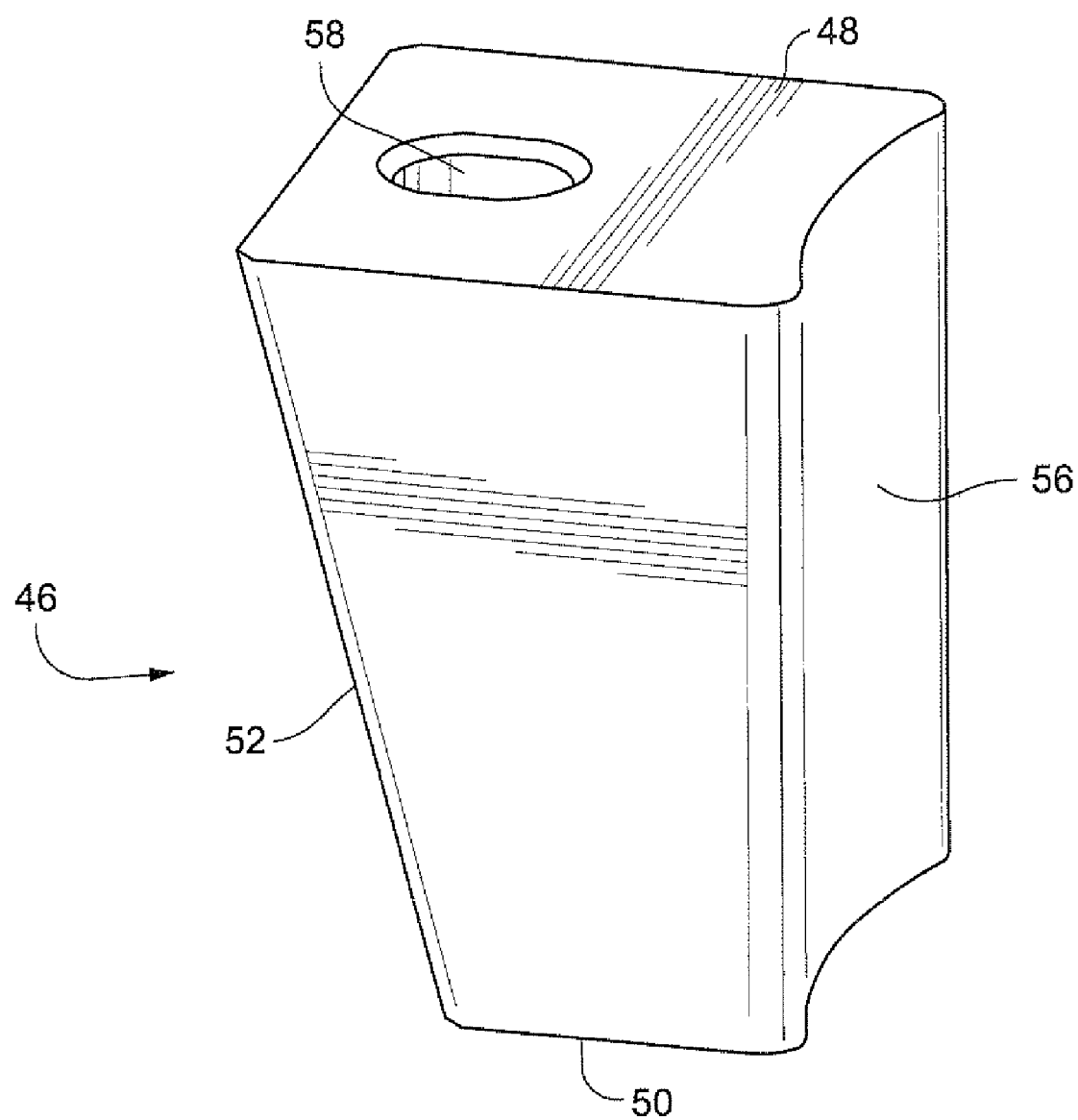
FIG. 6 is a perspective view of a clamp wedge for the slip joint clamp assembly.

FIG. 6 is a side view of an exemplary wedge 46. The wedge may be generally a rectangular stainless steel block having a relatively wide end 48, a narrow end 50 and an inclined sidewall 52 between the two ends. The inclined sidewall may be a flat surface adapted to fit into and slide against a channel 54 (see FIG. 4) in an inner surface of one of the half-housings 38, 42. An opposite sidewall 56 on the wedge 46 may be curved in cross-section to abut an outside surface of the downcomer pipe. The wedge includes a bolt slot (hole) 58 extending axially through the wedge and adapted to receive the shaft of a wedge bolt 60 (FIG. 4). The bolt 60 extends through upper and lower wedges 46 that are arranged in upper and lower sections of the slip clamp assembly 32. Each bolt extends (axially) through the slip clamp assembly and applies an axial preload (tensile force) to the wedges 46 at the opposite ends of the bolt. The bolt axial preload causes the wedges to slide inward along the inclined surface of the channels 54 of the housing. As the wedges are pulled towards each other they center the downcomer pipe and slip joint within the slip joint clamp housing, thereby supporting the downcomer pipe.

Figure 7:
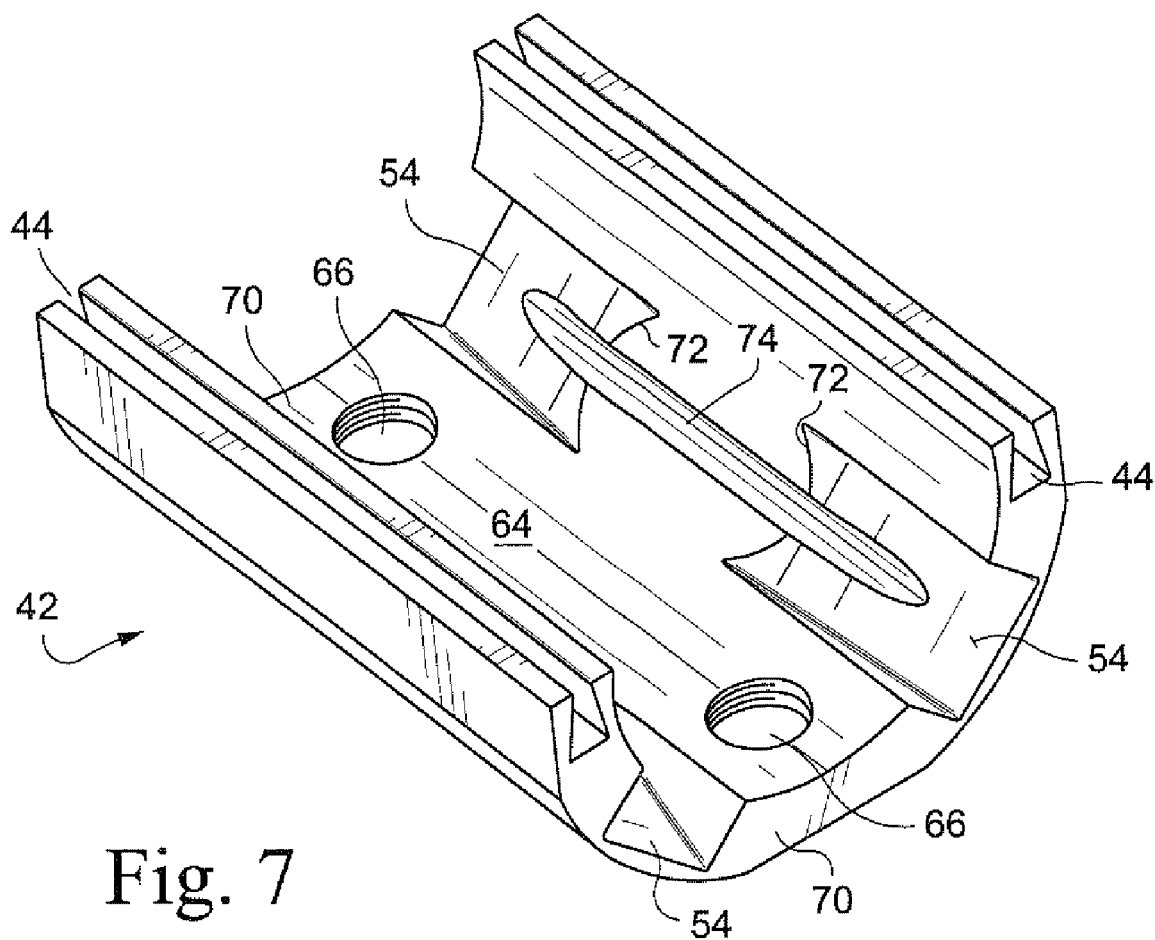
FIG. 7 is a perspective view a female half housing for the slip joint clamp assembly.

FIG. 7 is a perspective view of a half housing 42, and particularly the female half housing. The inside surface 64 of the half-housing faces an outer surface of the downcomer pipe when the housing is installed on the pipe. The inside surface of the female half housing 64 is substantially the same as the inside surface of the male half housing. The inside surface 64 of each half housing includes a generally smoothed cylindrical surface adapted to fit around the downcomer pipe. Threaded holes 66 along an axial center line of the half housing are provided for the crimp collars and lateral pins 36. The inside surface includes channels 54 having inclined surfaces to receive the inclined sidewalls of the wedges.

The channels 54 are arranged at the upper and lower ends 70 of the half housings. Further, each channel is aligned axially with another channel at an opposite end of the half-housing. In one embodiment, there are eight (channels) arranged in pairs arranged symmetrically around the inside surface of the half housings. The channels 54 are preferably deepest at the axial ends 70 of the half housings and gradually become more shallow as the channel advances axially inward along the inside surface 64 of the half housing. Each channel 54 may have an inner end 72 at an axially inward section of the inside surface of the half housing. Further, a narrow slot 74 provides clearance for the wedge bolt extending between a pair of axially aligned channels 54.

Figure 8:
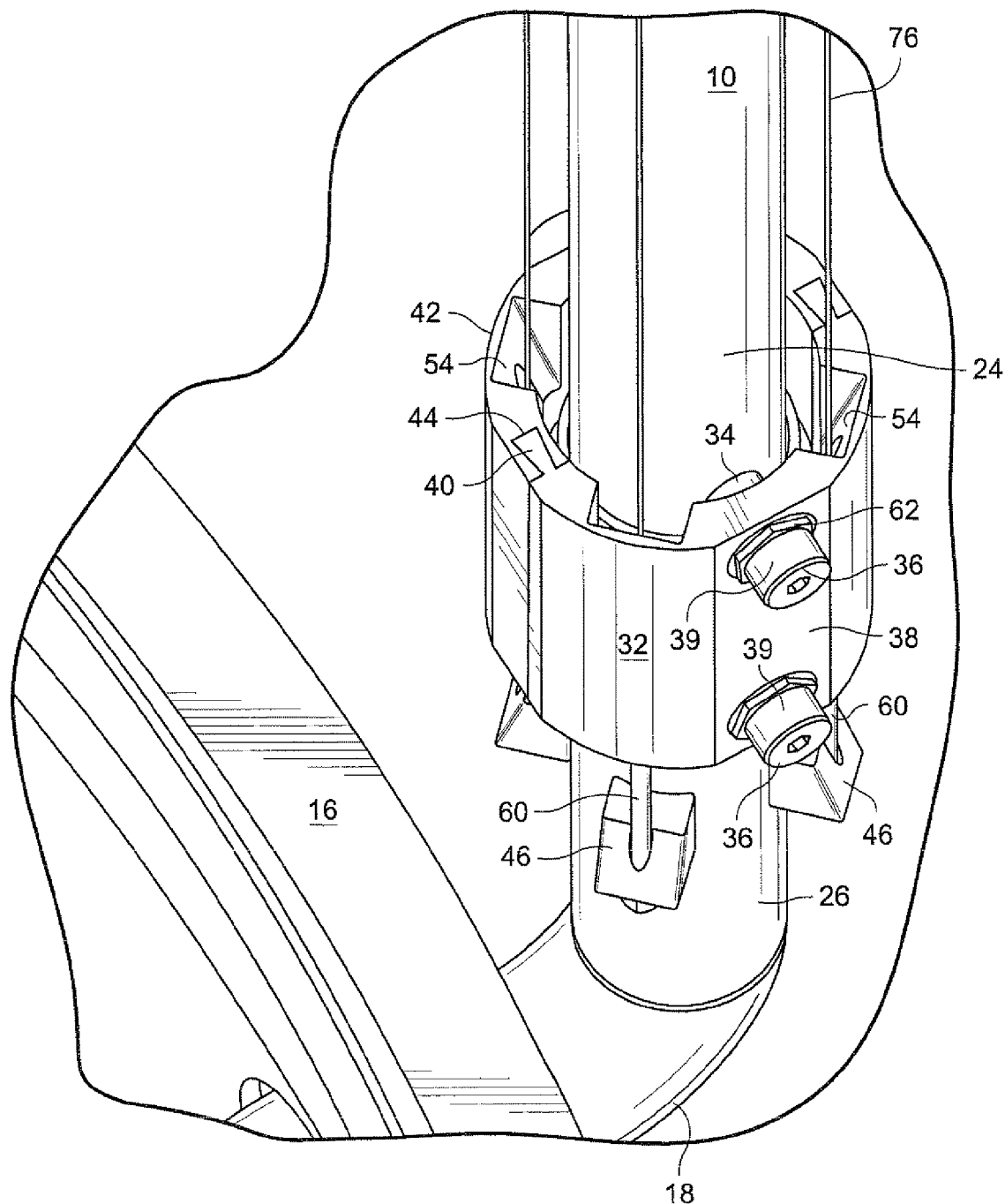
FIGS. 8 to 10 are perspective views of a partially assembled slip joint clamp assembly attached to the downcomer pipe.
Figure 9:
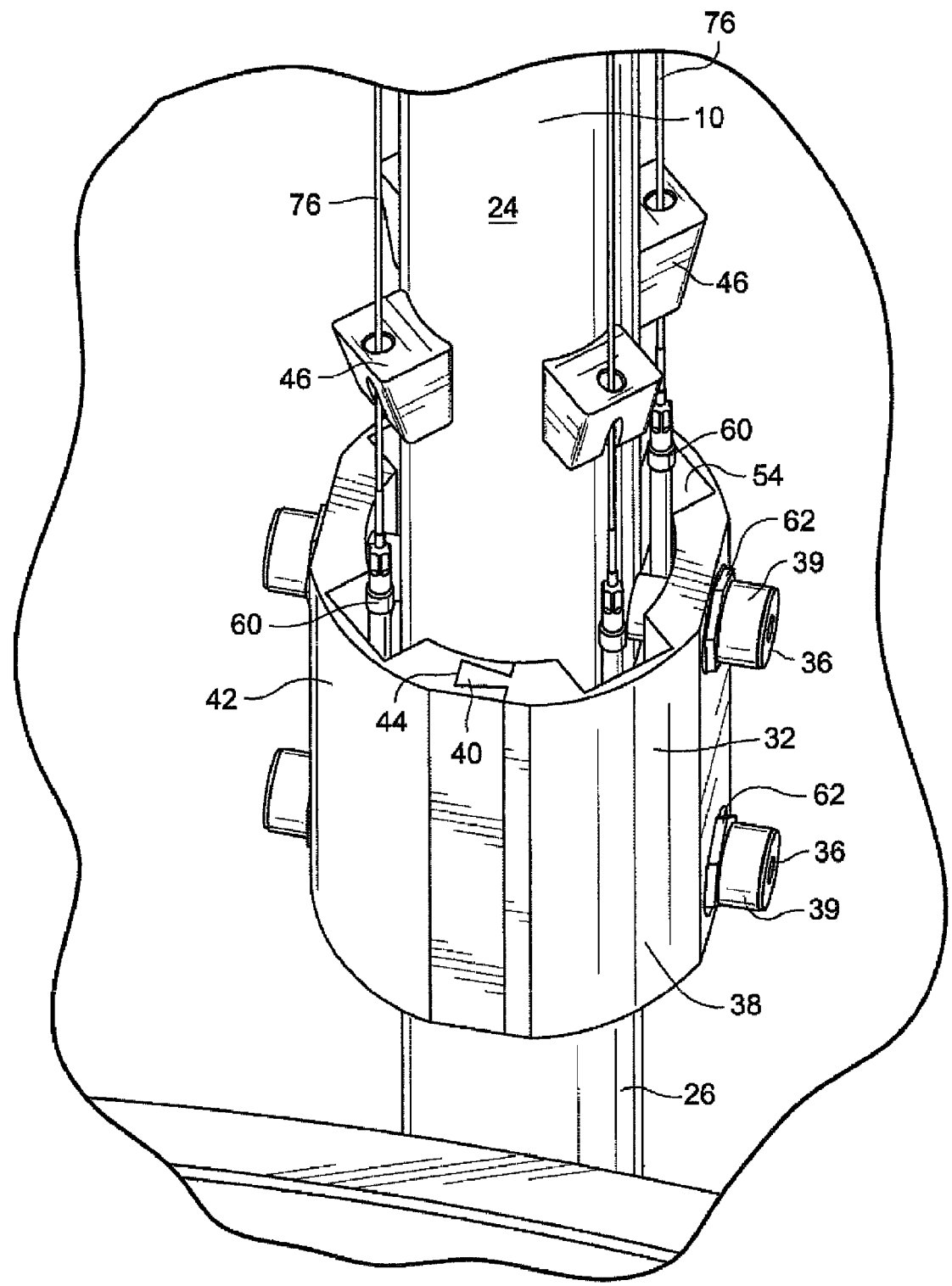

FIGS. 8 and 9 are perspective views of the slip joint clamp 32 being assembled around a downcomer pipe 10. As shown in FIG. 8, The connectors 40 of the male half housing 32 has already slid axially into the slots 44 of the female half housing. In addition, the lateral pins 36 are inserted and are shown as engaging the conical holes 34 made in the downcomer pipe to receive the pins.

Further, a guide wire 76, e.g., a flexible stainless steel cable, supports an upper end of each wedge bolt 60 during the assembly process. The guide wires 76 may extend down to the slip joint of the downcomer pipe from the refuel floor of the reactor core containment building. A lower wedge 46 is slid on the wedge bolt and the guide wire is attached to the upper end of the wedge bolt. The wedge, wedge bolt and guide wire are arranged such that the guide wire 76 preferably passes through the slot (item 74 in FIG. 7) on the inside surface of one of the half housings, (inserted after housing assembly and lateral pin insertion) as the assembled half housings are assembled around the downcomer pipe and slid into position over the slip joint. In the embodiment disclosed herein, four guide wire, wedge bolt and lower wedge assemblies are each arranged in a respective slot 74 of the mated half housings.

The guide wires 76 assist in aligning the lower wedge 46 and the wedge bolt 60 with the channel 54 and slot 74, respectively, of a half housing. The guide wires may extend up to the refuel floor of the core, where the wire is controlled by a technician installing the slip joint clamp. The guide wires may also assist in positioning the slip joint assembly over the slip joint using the guide wire to move the assembly axially along the pipe.

As shown in FIG. 9, the wedges 46 are positioned below the lower axial end of the half housings until the housings are aligned with the slip joint and the lateral pins 36 are turned into the holes 34 in the downcomer pipe. As shown in FIG. 9, the guide wires elevate the wedge bolts and the lower wedges, such that the lower wedges slide into their respective channels 54 in the lower portion of the half housings. In addition, the guide wires 76 pull the wedge bolts up through the gap between the slip joint clamp and downcomer pipe and into the slots 74 on the inside surfaces of the half housings.

Upper wedges 46 are lowered along the guide wires 76 to the wedge bolts 60. The upper wedges slide over the upper end of the bolts and slide into their respective channels 54 in the upper axial end of the half housings.

Figure 10:
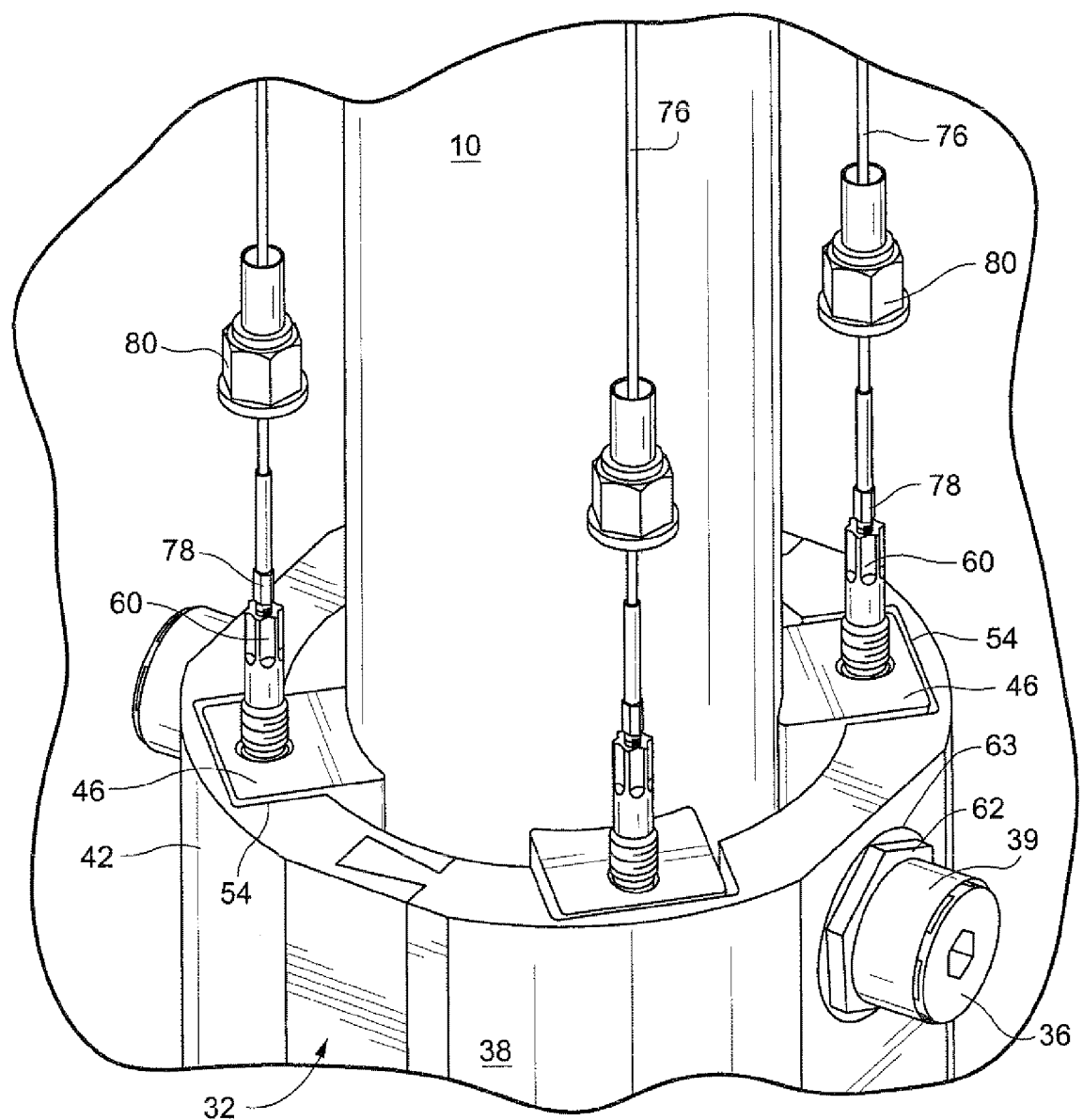

FIG. 10 is a perspective view of an upper section of the slip joint clamp 32 in which upper wedges 46 have been slid into channels 54 of the half housings 38, 42. The upper threaded ends of the wedge bolts 60 extend upward through the wedges. A predetermined torque is applied to the keeper nuts 80 to apply a desired tension force to the bolt and the opposing pair of wedges 46 on the bolt. The tension force causes the wedges to slide into the inclined channels 54 and firmly abut against both the half housings and the downcomer pipe. The slip joint clamp assembly is secured to the downcomer pipe by the wedges and lateral pins.

The upper ends of the bolts are attached to the guide wires 76 by a stainless steel swage fitting 78. The swage fittings have external threads, which engage internal threads in the ends of the wedge bolts. Once the keeper nut 80 is secured to the end of the wedge bolt 60, the guide wires 76 are removed from the ends of the wedge bolts 60.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A slip joint assembly in combination with a downcomer pipe in a core spray system of a nuclear reactor pressure vessel, the slip joint assembly comprising:
   a housing sleeve formed around a slip joint in the downcomer pipe, wherein an annular gap exists between an inside surface of the housing sleeve and the downcomer pipe;
   an upper wedge and a lower wedge insertable in the gap;
   a wedge bolt extending through the gap and extending through the upper wedge and lower wedge, wherein the bolt applies a force pulling the upper and lower wedges together to secure the housing sleeve to the downcomer pipe;
   an upper pin extending from the housing sleeve into an aperture of an upper section of the downcomer pipe, and
   a lower pin extending from the housing sleeve into an aperture of a lower section of the downcomer pipe.

2. The slip joint assembly in claim 1 wherein the housing sleeve comprises mated housing halves, wherein the housing halves are joined along axial edges.

3. The slip joint assembly in claim 1 wherein the upper pin includes an upper lateral pin extending through an upper threaded opening in the housing sleeve and into the aperture of the upper section of the downcomer pipe and the lower pin includes a lateral pin extending through a threaded opening in the lower aperture of the housing sleeve and into the aperture of the lower section of the downcomer pipe.

4. The slip joint assembly in claim 1 wherein the inside surface of the housing sleeve includes an upper inclined surface to receive the upper wedge and a lower inclined surface to receive the lower wedge.

5. The slip joint assembly in claim 1 further comprising four pairs of the upper wedge and the lower wedge, wherein the four pairs are arranged symmetrically around the gap.

6. The slip joint assembly in claim 1 further comprising a guide wire connected to an end of the wedge bolt during assembly of the slip joint assembly, wherein the upper wedge slides along the guide wire to the bolt.

7. A slip joint assembly in combination with a downcomer pipe in a core spray system of a nuclear reactor pressure vessel, the slip joint assembly comprising:
   a housing sleeve formed around a slip joint for the downcomer pipe;
   an annular gap between an inside surface of the housing sleeve and the downcomer pipe;
   an upper wedge and a lower wedge in the gap and abutting inclined surfaces on the inside surface of the housing sleeve;
   a wedge bolt extending through the gap and extending through the upper wedge and lower wedge, wherein the bolt applies a force pulling the upper and lower wedge together to secure the housing sleeve to the downcomer pipe, and
   a guide wire connected to an end of the wedge bolt during assembly of the slip joint assembly, wherein the upper wedge slides along the guide wire to the bolt.

8. The slip joint assembly in claim 7 wherein the housing sleeve comprises a mated housing halves joined along axial edges.

9. The slip joint assembly in claim 7 further comprising an upper lateral pin extending through a threaded opening in the housing sleeve and into an aperture of an upper section of the downcomer pipe, and a lower lateral pin extending through a threaded opening in the housing sleeve and into an aperture of a lower section of the downcomer pipe.

10. The slip joint assembly in claim 7 wherein the inside surface of the housing sleeve includes an upper inclined surface to receive the upper wedge and a lower inclined surface to receive the lower wedge.

11. The slip joint assembly in claim 7 further comprising four pairs of the upper wedge and the lower wedge, wherein the four pairs are arranged symmetrically around the gap.

12. The slip joint assembly in claim 7, further comprising a guide wire connected to an end of the wedge bolt during assembly of the slip joint assembly, wherein the upper wedge slides along the guide wire.

* * * * *